Jan. 6, 1970  N. A. BEDDOWS  3,488,537
DYNAMOELECTRIC MACHINE HAVING FLUOROCARBON PLASTIC
FILM INSULATION AND METHOD OF MAKING THE SAME
Filed April 4, 1967  2 Sheets-Sheet 1

INVENTOR
NORMAN A. BEDDOWS
BY *James C. Davis Jr.*
HIS ATTORNEY

United States Patent Office 3,488,537
Patented Jan. 6, 1970

3,488,537
DYNAMOELECTRIC MACHINE HAVING FLUOROCARBON PLASTIC FILM INSULATION AND METHOD OF MAKING THE SAME
Norman A. Beddows, Schenectady, N.Y., assignor to General Electric Company, a corporation of New York
Filed Apr. 4, 1967, Ser. No. 628,431
Int. Cl. H02k 3/34
U.S. Cl. 310—179
9 Claims

ABSTRACT OF THE DISCLOSURE

An electric motor is fabricated with winding insulation comprising a multiple wrapping with a laminated fluorocarbon polymer tape having fusible and infusible sides. The fusible sides of two successive tapes are turned toward each other to provide a mechanical bond between the tapes.

BACKGROUND OF THE INVENTION

Field of the invention

The present invention pertains to conductors and insulators of electricity and, more specifically, pertains to insulated multiple conductor assemblies of non-circular section suitable for use in the primary winding of rotary dynamoelectric machines.

Description of the prior art

It is well known to use fluorocarbon polymers, as polytetrafluoroethylene, for the insulation of electrical wire. The advantageous properties of fluorocarbon polymers are known, for example, as set forth in the publication Du Pont: Teflon, Tetrafluoroethylene Resins, Properties. Uses, copyright 1957, E. I. du Pont de Nemours and Co., Inc. It has been suggested to apply the insulation to wire by extrusion, by helical wrapping of a tape, by heat-shrinking of tubular stock, by liquid coating, and by parallel wrapping of tapes. Fluorocarbon polymer tapes having pressure sensitive adhesives thereon are also known, for example, as described in U.S. Patent 2,765,241.

It is oftentimes necessary or highly desirable to provide an electric motor or generator which can endure operation in a highly corrosive and conductive environment. One example is a drive motor encased within a high-pressure compressor of the kind useful in chemical processing plants. Heretofore known motors used in such environments have required relatively frequent maintenance in the form of purging with inert gases and/or disassembly and removal for baking in an oven. While fluorocarbon insulating materials have well-known physical and chemical properties which should be useful in certain electric motor and generators, many of these same properties, as a slick chemically inert surface which resists bonding, for example, present problems not heretofore solved in dynamoelectric machine applications, particularly in the case where conductive, corrosive environments are encountered which tend to lessen rapidly the surface and volume resistivities requisite in such applications.

OBJECT OF INVENTION

A primary object of this invention is to provide a dynamoelectric machine capable of sustained operation in conductive, corrosive environments without requiring purging or removal for baking and drying at frequent intervals.

Another object of this invention is to provide a dynamoelectric machine having a mechanically sealed fluorocarbon material insulation system.

SUMMARY OF THE INVENTION

Briefly, I have discovered that a suitable fluorocarbon polymeric insulation applied in the form of a laminated or composite tape having a first outer surface of polytetrafluoroethylene polymer (TFE) and a second outer surface of polyfluoroethylene-perfluoropropylene (FEP) can be applied to conductors in such a manner as to withstand the rigors of dynamoelectric machine construction and to provide the required mechanical seal for sustained machine operation in conductive, corrosive environments. The strand conductors are preferably of rectangular section aluminum and two tapes are applied consecutively under a tension in the range of from 1000 to 1500 lbs./in.$^2$. The tapes are applied with the respective FEP sides thereof in contact and a mechanical seal is formed therebetween, preferably by heating the wrapped conductor to at least the fusion temperature of FEP, 545° F. After the machine coils are wound, a similar ground wall wrapping has been found to be advantageous.

DETAILED DESCRIPTION

The electrical insulation of a dynamoelectric machine winding in accord with the invention is contributed by fluorocarbon polymeric material that provides both the requisite volume resistivity and surface resistivity for suitably inhibiting undesired electric current conduction between conductive parts of the machine which assume different electric potentials during normal operation thereof. Such conductive parts include different portions of the winding itself, as well as the winding and machine structure adjacent thereto, for example, the walls of the usual conductor-receiving slots in a laminated iron core.

(a) Strand insulation

The presently preferred fluorocarbon polymers for use in the practice of the invention are polytetrafluoroethylene polymer and polyfluoroethylene-perfluoropropylene copolymer, or TFE and FEP, as these polymers are respectively known in the art and will be designated hereinafter and in the appended claims. TFE and its method of manufacture are particularly well known, and this material is presently available under the brand name "Teflon," for example, that is a trademark registered by E. I. du Pont de Nemours and Company. FEP is also a commercial material and is commonly made by fluorination of a mixture of ethylene and propylene.

F.E.P. can be sintered, or cured at a temperature of approximately 545° F. and has been found to bond to itself to provide a seal at this temperature at realizable taping pressures.

Thin tapes of sintered TFE or FEP are available and are usually the result of skiving an extruded and rolled product, as is well known. A preferred tape for use in accord with this invention is a laminar product having one principal surface of sintered TFE and the other principal surface of FEP. Dispersion is one convenient technique of making such a tape and involves deposit of FEP in an aqueous carrier on a tape of TFE and thereafter drying by the application of heat. Alternatively, laminar tapes of this kind are commercially available, and one which has been found to be particularly suitable for practice of this invention is designated Dilectrix DF 1700–3 tape. This particular tape is available in convenient sizes, for example, 3¼ mil by ⅝ inch and 2 mil by ½ inch. The principal electrical properties are a dielectric constant of 2.0 and a power factor of $3 \times 10^4$ ohms (both in the range of from 60 to $10^8$ c.p.s.), and surface and volume resistivities (100% relative humidity in air) of $3.6 \times 10^6$ megohms and $10^{15}$ ohm-cm., respectively.

Figure 1:
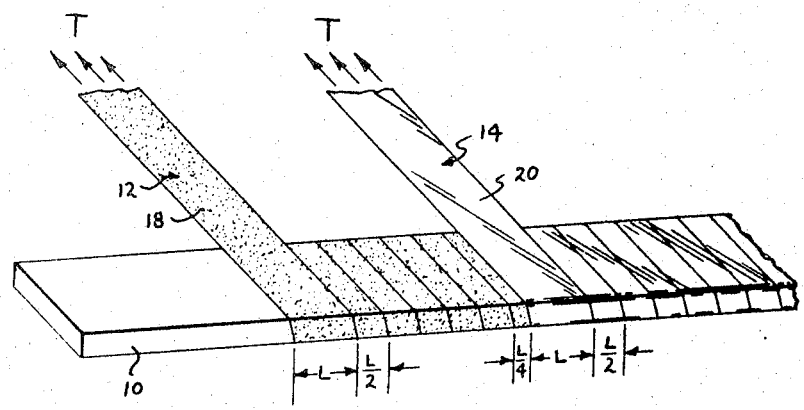
FIGURE 1 illustrates a conductor strand being wrapped in accord with the preferred embodiment of this invention.
Figure 2:
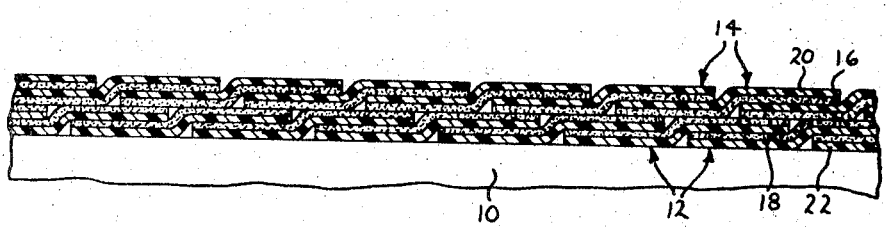
FIGURE 2 is an enlarged partial cross-section view of a conductor, wrapped as shown in FIGURE 1, and illustrates the relationship of the wrapped insulating tapes.

As illustrated in FIGURE 1, an elongated conductor 10 is sequentially wrapped helically about its axis by an inner tape 12 and an outer tape 14 under tension, T. Tapes 12 and 14 are each half-lapped over themselves, i.e., two turns of each tape are required to progress one tape width along the conductor axis, and tape 14 lags tape 12 by an odd number of quarter tape widths, that is to say, corresponding points of the tapes are relatively axially spaced along the conductor by such a distance. FIGURE 2 illustrates the space relationship of tapes 12 and 14 after they are half-lapped relative to themselves and quarter-lapped relative to each other.

In FIGURE 2, the unsectioned portions 16 and 18 of tapes 12 and 14, respectively, represent FEP, whereas the sectioned portions 20 and 22, respectively, represent sintered TFE. Thus, in the preferred embodiment shown, composite tape 12 is wrapped with the sintered TFE side thereof facing inwardly and abutting conductor 10, and the composite tape 14 is wrapped with the sintered TFE side thereof facing outwardly. In this way the fusible FEP sides of tapes 12 and 14 are abutting, or in actual contact, and are adapted to provide a seal layer of fused FEP intermediate the insulation thickness, or build. The helical wrappings are conveniently provided by automatic taping equipment, for example, having synchronized automatic-clutch taping heads, and the indicated fusion or bonding is thereafter accomplished by heating the wrapped conductor to the fusion, or bonding, temperature of FEP, preferably by passing through an induction heater unit and/or an infrared furnace. The latter alone is best because it permits finer control and reduces heating of the conductor which results in some softening thereof, particularly in the case of aluminum. The insulated conductor is advantageously retrieved on an automatic tensioned rewind roll, after having passed through water-cooled rolls, or other cooling means.

Figure 3:
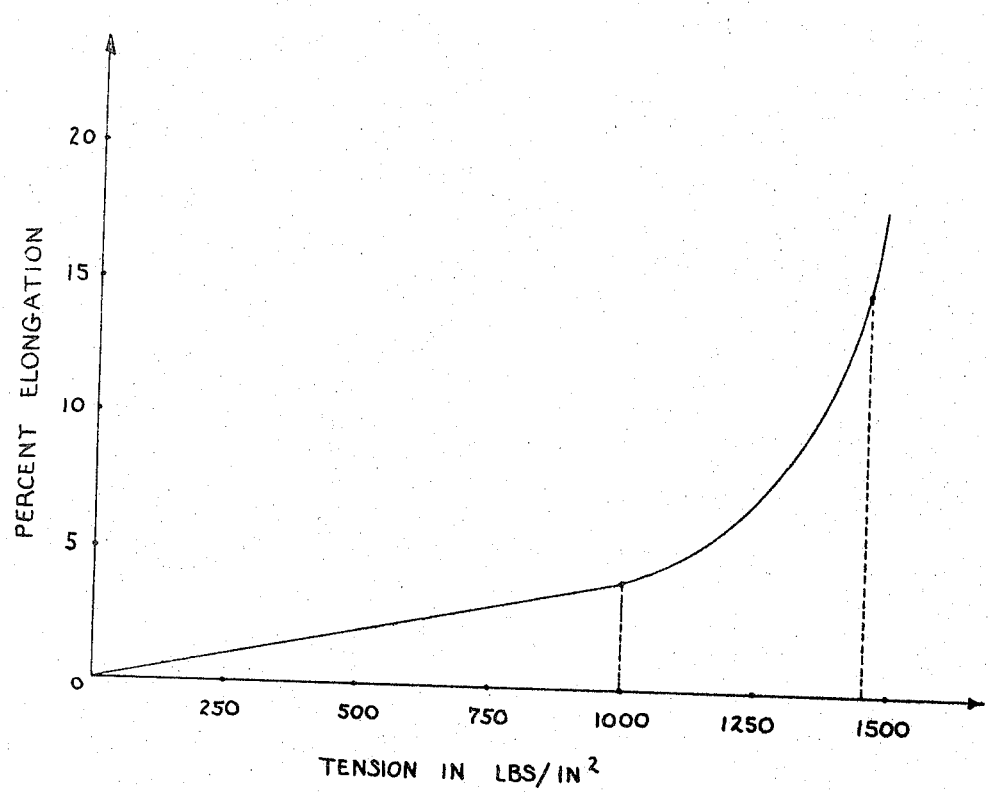
FIGURE 3 is a graphical representation of elongation versus tension for a preferred taping material.

The percentage of tape elongation during wrapping has been found to be critical. For the thin tapes of interest, for example, within the range of from 1 mil to 10 mils in thickness, the taping tension at room temperature should be in the range from about 1000 to 1500 lbs./in.$^2$. In a 2 mil thick tape ½ inch wide, this tension is provided by a force in the direction of wrap of from 2 to 3 lbs., for example. As illustrated in the plot of FIGURE 3, the corresponding percent elongation is from about 4% to 15%. The tension required to produce the desired elongation decreases somewhat as the temperature is increased and, in general, it can be said that the tension should be such that a translucent strip of tape appears light orange in color when stretched between two cross-polarized filters and viewed against a high intensity light source. This dicrotic effect can be used as an estimate of strain and light orange represents the color at the onset of permanently induced strain, i.e., the region immediately above the Hook's Law region, where the tape viewed as above is colorless.

The optimum taping tension permits a very slight cold flow so that the tape conforms tightly to the wrapped surface without air spaces, while at the same time the percent elongation is less than 15 to avoid severe strains. The latter occur particularly at the corners in the case of a rectangular conductor and generally tend to cause cracking of the insulation during subsequent forming operations if 15% elongation is substantially exceeded. Unfortunately, TFE can only be annealed at temperatures much too high for purposes of the present invention. In one example, the optimum taping force for a tape 3¼ mils by ⅝ inch was determined to be approximately 2½ lbs., corresponding to a tension of about 1250 lbs./in.$^2$ and causing an elongation of 7%. This is the preferred amount of elongation for practice of this invention with the typical tape thicknesses ranging from 1 to 10 mils.

Rectangular aluminum conductors having a cross section of .260 x .110 inch were wrapped as set forth above with the 3¼ mil tape to provide a strand wall thickness of approximately 12 mils. The rigors of coil forming were simulated by bending the sample conductors one turn about a ½ inch round mandrel and then giving them a ½ turn twist. The samples were thereafter immersed in water containing a nonionic wetting agent (1%) and salt (5%). Each of the six samples tested withstood a voltage in excess of 7500 volts before failure. The electrical and mechanical ratings are, accordingly, very high, particularly when the severity of the twists is considered. In this test, the mechanical working was done at room temperature. By working the wrapped conductors at higher temperatures up to 80° C., the possibility of insulation rupture becomes appreciably less likely. Higher temperatures, of up to 125° C., for example, do not give any pronounced improvement over working at 80° C.

(b) Coil construction

The coils are made preferably by (1) forming the bobbin coils, (2) overwrapping the bobbin coils with FEP and an outer layer of TFE–FEP composite tape with the FEP side inwardly, (3) molding the slot portions of the coils, (4) pulling the coils to provide end turns, and (5) applying an outer coil cover of mechanical armor.

The bobbin coils are typically formed by winding one or more insulated strands about a mandrel having semi-circular ends and an elongated rectangular central portion. In the case of aluminum conductors that have become softened, the turning tension should not exceed about fifteen pounds. The mandrel surfaces advantageously are covered with a soft but durable coating as polyurethane or TFE, for example.

The bobbin coil sides are overwrapped with FEP and a final outer layer of TFE. This overwrap can be done with a single half-lapped composite TFE–FEP tape; however, it has been found preferable to use a double overwrap with a first tape of FEP and a second composite tape with the TFE side thereof outward. In one particularly advantageous overwrap, a 1 inch by 5 mil tape of FEP was half-lapped directly over the strands and followed by a half-lapped 1 inch by 5 mil tape of TFE–FEP with the TFE side thereof outermost.

To obtain rigidity needed for dimensional stability of the coils under operating conditions, it is necessary to hot mold the coils. It is not possible to use successfully conventional molding strips because of the difficulty in bonding to the TFE exterior of the strand insulation at temperatures that would not destroy the bond of the strand insulation. To enable subsequent pulling of the bobbin coils, it is important that only the slot portions of the coils be hot molded, and not the corner, or end, portions thereof. The mold temperature is advantageously selected to be from 625° F. to 635° F. and with the overwrap as set forth above, a dwell time (no compression) of 1 minute followed by a light compression time of from 3 to 4 minutes is used. Because TFE is the outermost layer of the overwrap, no particular mold release problem is encountered. It has been found that the laminated TFE–FEP systems of this invention yield coils of substantially more uniform dimensions than is achievable with a basically FEP system, indicating a much greater thermal-dimensional stability by following the teaching herein. In general, the FEP should be heated above its melting point of 545° F. for from 3 to 4 minutes, and the time and temperature cycle to accomplish this can, in the general case, be determined by using a buried thermocouple, for example.

Pulling the coils, or final forming of the coil configuration, involves twisting of the end portions and generally represents the highest localized stresses to which the coil is subjected. Accordingly, preferred practice of this invention includes wrapping the nose and shoulder portions (end portions of the bobbin coil) with a protectice sacrifice first tape of heat-shrinkable polyethylene terephthalate and a second tape of glass, and preheating the bobbin coils to a temperature of from 80° C. to approximately 120° C., immediately before they are pulled-out. In this way, stress-cracking of the insulated coils is avoided altogether during pulling. Also, it is best to provide protective resilient jackets, of rubber, for example, about the coil leads during pulling. After pulling, any sacrifice tapes and/or protective jackets are removed.

The final step in coil forming is to apply an armor coating about the coil. The armor coating can be the same as is otherwise used for coil ground insulation and may be, for example, an epoxy resin-impregnated mica and glass tape. The selection of the armor coating need not necessarily consider the electrical properties of the armor in the operational environment so that its structural underlying TFE–FEP composite system is relied upon entirely for electrical insulation purpose. It is only important that the mechanical integrity of the armor not be degraded in the operational environment so that its structural contribution and/or abrasion resistance is not deleteriously affected thereby. Freedom from electrical performance characteristics permits a wide selection of suitable materials for the armor in even the most hostile environments. In a particularly satisfactory embodiment for use in a high-pressure ammonia environment, the armor consisted essentially of (1) one layer of 5 mil, half-lapped TFE–FEP composite tape, (2) 2½ wraps of 9 mil mica tape (total thickness of 45 mils), and (3) one layer of half-lapped 4 mil glass tape, for a total armor build of approximately 65 mils. Of course, it is always desirable to select a ground wall having useful electric insulation properties, also, in cases where the environment permits such a selection to be conveniently made.

(c) Winding the stator

The winding coils of this invention can be used in either a rotor or a stator; however, the latter use is more common and will be described. The coils are inserted with the coil sides in corresponding stator slots and wedged securely therein. The series and phase leads are prepared for connection to form any of the usual winding configurations, for example, a three-phase chain winding. The electrical connections are made by soldering, brazing, welding, or the like.

The series and phase connections are similar to the coil side and armor insulations. For example, the connection insulation can consist essentially of two one-half lapped layers of 5 mil x 1 inch FEP tape with an overwrapping of one one-half lapped, 5 mil x 1 inch TFE–FEP tape with the FEP side thereof inwardly. Both layers extend over the strand insulation. The FEP can then be fused, as by using a hot hand mold, at 625° F. A most surprising result is that the latter molding step is optional and the use of an unfused connection insulation has been found to provide suitable performance in highly corrosive and conductive atmospheres. The taping should feature tight wrapping as defined above under strand insulation. The connection insulation is completed by two one-half lapped layers of 9 mil mica tape followed by two one-half lapped layers of 4 mil glass tape, in a typical case.

In forming the circuit ring, a wrap is provided corresponding to the FEP, TFE–FEP wrapping of the lead and phase connections. It is preferred, however, to overwrap the foregoing with a sacrifice taping of glass and one of heat-shrinkable (6%, for example) polyethylene terephthalate and to heat the ring to fuse the FEP. The heating is advantageously conducted until the polyethylene terephthalate outer layer disintegrates, and then the sacrifice tapings are removed. After cooling, the circuit ring can be wrapped with mica tape and glass tape, as previously described.

In preferred practice of the invention, a wound stator as fabricated above is vacuum-pressure-impregnated with epoxy resin, advantageously in three successive cycles of this process. The additional cycles have been found to provide enhanced mechanical stability.

In general, a stator fabricated as described above has been found to be useful in low voltage motors, i.e., having a primary voltage of less than 750 volts RMS. In one specific example, a stator produced by the above method was used in a 500 HP, 2 pole, 3 phase, 60 c.p.s., 440 volt induction motor. The motor was enclosed within a pressure vessel and drove a compressor. The motor environment includes an axial flow of from about 8 to 13 percent liquid ammonia, remainder nitrogen and hydrogen (incidental water, oil, iron oxide and other contaminants) at a temperature of from approximately 80° F. to 120° F. under a pressure of approximately 5000 p.s.i. The estimated flow through the motor air gap is about 2 c.f.m. This motor is currently continuing sustained operation without purging after 5 months of such operation, representing, to date, more than double the known useful lifetimes of prior art motors in such environments and clearly demonstrating the strong mechanical insulation seal achieved through practice of the present invention. Furthermore, this advantageous machine is equipped with rectangular winding conductors, as described, that are essentially required in machines of this size to minimize losses and which conductor shape presents a maximum strand insulation problem because of the relatively abrupt corners involved. Also, the conductors are fabricated from aluminum, as opposed to copper, to minimize salt accumulation, or dendritic growth, and conductor corrosion. Finally, the soundness of an intermediate insulation seal, with only mechanical contact and without any bonding or adherence to the conductor itself, is demonstrated and this construction is particularly useful in the case of aluminum, having an oxide layer which is neither receptive to bonding or economical removal.

The foregoing is a description of an illustrative embodiment of the invention, and it is applicant's intention in the appended claims to cover all forms which fall within the scope of the invention.

What I claim as new and desire to secure by Letters Patent of the United States is:

1. The method for electrically insulating an elongated electrical conductor of substantially rectangular cross section, said method comprising:
   (a) providing first and second thin laminar insulating tapes each having an infusible fluorocarbon polymer surface and a fusible fluorocarbon polymer surface;
   (b) helically wrapping said first tape on said conductor with the infusible side thereof contacting the conductor surface;
   (c) helically overwrapping said second tape about said first tape with the fusible sides of said tapes contacting each other; and
   (d) heating the wrapped conductor assembly to a temperature sufficient to fuse the fusible sides of said tapes together.

2. The method of claim 1 wherein the thickness of each of said tapes is in the range of from 1 to 10 thousandths of an inch.

3. The method of claim 1 wherein said tapes are helically wrapped in the same circumferential direction to approximately half-lap themselves and to quarter-lap each other.

4. The method of claim 1 wherein said fusible fluorocarbon polymer is polyfluoroethylene-perfluoropropylene copolymer and said temperature is at least 545° F.

5. The method of claim 4 wherein said infusible fluorocarbon polymer is polytetrafluoroethylene polymer.

6. An electrical current conductor comprising:
   (a) an inner core of electrically conductive material of rectangular cross section; and
   (b) an integral electrically insulating cover surrounding said core comprising an inner layer of infusible fluorocarbon polymeric material in mechanical contact only with said conductor, an intermediate layer of fused fluorocarbon polymeric material, and an outer layer of infusible fluorocarbon polymeric material.

7. The conductor of claim 6 wherein said infusible fluorocarbon polymeric material of said inner and outer layers is polytetrafluoroethylene polymer and said fusible fluorocarbon polymeric material is polyfluoroethylene-perfluoropropylene copolymer.

8. The method for making a dynamoelectric machine coil comprising the steps of:
   (a) double wrapping helically an elongated rectangular strand conductor with first and second tapes each having a thickness in the range of from 1 to 10 thousandths of an inch and being of laminar construction having an infusible polytetrafluoroethylene polymer material side and a fusible polyfluoroethylene-perfluoropropylene copolymer material side, said tapes being half-lapped relative to themselves and quarter-lapped relative to each other and the polyfluoroethylene-perfluoropropylene copolymer sides of said tapes being turned toward each other;
   (b) heating the insulation wrap to at least 545° F. to fuse said polyfluoroethylene-perfluoropropylene copolymer layers together and private a mechanical seal intermediate the insulation build;
   (c) forming a coil comprising turns of the wrapped conductor;
   (d) wrapping helically said coil with a thin tape comprised at least in part of polyfluoroethylene-perfluoropropylene copolymer material;
   (e) hot molding opposite portions of said coil to provide linear coil sides while leaving unmolded end and lead portions thereof;
   (f) preheating said coil to a temperature of at least approximately 80° F. and pulling the coil to form end turns at opposite ends thereof; and
   (g) overwrapping said coil with a mechanical armor.

9. A dynamoelectric machine comprising:
   (a) a plurality of coils having coil sides, coil end turns and coil leads;
      (i) said coils each having a plurality of rectangular conductor strands, said strands having individual electrical insulation coatings comprising at least two layers of polytetrafluoroethylene polymer sandwiching an intermediate layer of polyfluoroethylene-perfluoropropylene copolymer;
      (ii) coil insulation comprising an inner layer of polyfluoroethylene-perfluoropropylene copolymer and an outer layer of polytetrafluoroethylene polymer; and
      (iii) a protective armor layer of relatively rigid material surrounding and conforming to the outer surface of said coil insulation;
   (b) series and phase connections selectively electrically joining said coil leads to provide a machine winding; and,
   (c) electrical insulation surrounding said connections and comprising one layer of polyfluoroethylene-perfluoropropylene copolymer and one layer of polytetrafluoroethylene polymer.

References Cited

UNITED STATES PATENTS

| 2,454,625 | 11/1948 | Bondon | 174—120.4 |
| 2,941,911 | 6/1960 | Kumnick | 264—127 |
| 3,069,302 | 12/1962 | Lewis | 174—120 |
| 3,388,458 | 6/1968 | Logan | 310—274 |
| 3,393,268 | 7/1968 | Meyer | 174—120 |

OTHER REFERENCES

Publication "Teflon"; August 1957, p. 9, E. I. du Pont de Nemours & Co., Wilmington, Del.

WARREN E. RAY, Primary Examiner

R. SKUDY, Assistant Examiner

U.S. Cl. X.R.

29—596, 605; 174—120